US010685771B1

(12) United States Patent
Krylov (10) Patent No.: US 10,685,771 B1
(45) Date of Patent: Jun. 16, 2020

(54) MAGNETIC JOINT AND OPTICAL MOUNT USING THE SAME

(71) Applicant: Light Steering Technologies, LLC, Hooksett, NH (US)

(72) Inventor: Vladimir G. Krylov, Brookline, NH (US)

(73) Assignee: Light Steering Technologies, LLC, Hooksett, NH (US)

( * ) Notice: Subject to any disclaimer, the term of this patent is extended or adjusted under 35 U.S.C. 154(b) by 0 days.

(21) Appl. No.: 16/296,613

(22) Filed: Mar. 8, 2019

(51) Int. Cl.
| | |
|---|---|
| *H01F 7/02* | (2006.01) |
| *H01F 1/44* | (2006.01) |
| *G02B 26/10* | (2006.01) |
| *H01F 7/06* | (2006.01) |
| *H02K 41/035* | (2006.01) |

(52) U.S. Cl.
CPC .............. *H01F 7/02* (2013.01); *G02B 26/101* (2013.01); *H01F 1/44* (2013.01); *H01F 7/06* (2013.01); *H02K 41/0356* (2013.01)

(58) Field of Classification Search
CPC ........................................................ H01F 7/02
See application file for complete search history.

(56) References Cited

U.S. PATENT DOCUMENTS

| | | | |
|---|---|---|---|
| 5,550,669 A | 8/1996 | Patel | |
| 5,821,655 A | 10/1998 | Tokushima et al. | |
| 6,566,992 B1 * | 5/2003 | Vicentelli | G09B 1/38 335/285 |
| 6,856,437 B2 | 2/2005 | Witt et al. | |
| 8,043,513 B2 | 10/2011 | Milanovic et al. | |
| 2003/0106230 A1 | 6/2003 | Hennessey | |
| 2015/0369418 A1 | 12/2015 | Wong et al. | |
| 2018/0095223 A1 * | 4/2018 | Wiley | F16M 11/18 |

(Continued)

FOREIGN PATENT DOCUMENTS

| | | | |
|---|---|---|---|
| CN | 105587757 A * | 5/2016 | .............. F16C 11/06 |
| EP | 2816723 | 12/2014 | |
| FR | 3007499 | 12/2014 | |

(Continued)

OTHER PUBLICATIONS

C. Belly et al., "Long Stroke/High Resolution Tip Tilt Mechanism", Actuator, 14th International Conference on New Actuators, Jun. 2014, Bremen, Germany, 3 pages.

(Continued)

*Primary Examiner* — Ramon M Barrera
(74) *Attorney, Agent, or Firm* — Finch & Maloney PLLC (57) ABSTRACT

A laterally unconstrained magnetic joint has a first component comprising a permanent magnet material; and a second component comprising a permanent magnet or ferromagnetic material, where the first component and the second component are magnetically attracted to each other, and where the first component and the second component interface via continuous interface surfaces of different curvature that form and maintain point contact throughout a range of angular and lateral actuation. Movement of the first component is laterally unconstrained with respect to the second component. One or more such magnetic joints can be used in a mount for a payload, such as an wide angle optical mount with three degrees of freedom. The mount may include linear actuators to position the payload.

20 Claims, 8 Drawing Sheets

(56) References Cited

U.S. PATENT DOCUMENTS

2019/0086634 A1    3/2019   Krylov

FOREIGN PATENT DOCUMENTS

| JP | 2007-032595 A | 2/2007 |
| JP | 2008-023076 A | 2/2008 |
| WO | 2008044229 A1 | 4/2008 |
| WO | 2018064462 A1 | 4/2018 |

OTHER PUBLICATIONS

PCT Search Report and Written Opinion for PCT Application No. PCT/US2019/021286, dated Nov. 18, 2019, 15 pages.

\* cited by examiner

MAGNETIC JOINT AND OPTICAL MOUNT USING THE SAME

FIELD OF THE DISCLOSURE

This disclosure relates generally to the mounting, positioning, and actuation of a payload, and in particular, to a magnetic joint and use thereof in mounting and actuation of an optical component.

BACKGROUND

Optical scanners can be used to steer a laser beam or a sensor that defines an imaging system field of view. Optical scanners may be used in materials processing, marking, packaging, optical coherence tomography, laser light shows, laser-based templating, and numerous other applications. The majority of optical scanners are mechanical systems using one of two implementations. A first implementation has two mirrors, each actuated along one rotational axis and positioned orthogonally to the other mirror to achieve a two-dimensional scanning field. A second implementation has a single mirror actuated in two orthogonal axes commonly known as tip-tilt. Both of these implementations, as they are currently available, have a number of non-trivial drawbacks.

BRIEF DESCRIPTION OF THE DRAWINGS

Embodiments of the present disclosure are illustrated as examples and are not limited by the figures of the accompanied drawings, in which.

The figures depict various embodiments of the present disclosure for purposes of illustration only. Numerous variations, configurations, and other embodiments will be apparent from the following detailed discussion.

DETAILED DESCRIPTION

A magnetic joint design is disclosed. The magnetic joint design is particularly well-suited for mounting, positioning, and actuation of a payload such as an optical component, although other payloads can benefit from the magnetic joint design, as will be appreciated in light of this disclosure. In an embodiment, a magnetic joint has a first component and a second component that are magnetically attracted to each other, where the first component and the second component interface via continuous interface surfaces that form and maintain point contact through a range of angular and lateral actuation. The interfacing surfaces allow for unconstrained lateral motion of the first component with respect to the second component. In one such example embodiment of the magnetic joint, the first component has a first interface surface and the second component has a convex second interface surface, where the second interface surface engages the first interface surface. The first interface surface can be planar or concave, for example. One or both of the components include a permanent magnet with a magnetic field aligned along the respective axis of the component. In one such example case, the first component includes a permanent magnet and the second component is made of a ferromagnetic material, although this arrangement could be reversed in still other embodiments, as will be appreciated. In any such case, the first and second components are attracted to each other by magnetic attraction along a joint axis that is perpendicular to the interfacing surfaces.

The laterally unconstrained magnetic joint can be part of a mount or positioning assembly, such as may be used for a sensor, optical component such as a grating, prism, reflector, a waveguide, or a scanning mirror, to name a few example payloads with which the magnetic joint can be used. For instance, in one example use case, a plurality of magnetic joints are attached to a payload, one or more of which is a laterally unconstrained magnetic joint. For example, three magnetic joints are connected to the back of a mirror or sensor and are arranged in a triangle-shape pattern on a back surface of the mirror or sensor. Some or all of the magnetic joints have unconstrained lateral movement between the first component and the second component, such as when the first interface surface is planar and when the second interface surface is convex. The mount may include a linear actuator on one or more of the magnetic joints, providing axial movement. The tip-tilt movement of the magnetic joint provides joint articulation with two rotational degrees of freedom. Combined with axial movement provided by the actuator, the laterally unconstrained magnetic joint can move with three degrees of freedom, in accordance with some embodiments. Numerous variations and embodiments will be apparent in light of the present disclosure.

General Overview

As previously noted, currently available optical scanner implementations, whether they include one or two mirrors, have a number of non-trivial drawbacks. For example, two-mirror optical scanning systems have large footprints. Also, the actuators (commonly a galvanometer) exhibit problems with positioning accuracy, such as drift over time and position errors due to environmental conditions. The errors of these two-mirror systems also pose calibration challenges. Further, the two-mirror systems have a scanning origin that is different for each of the two axes, which can be problematic for a number of applications. Available single mirror systems, commonly known as Fast Steering Mirror (FSM) actuators, are generally preferred over two-mirror systems. However, the challenges of a mechanical mechanism that allows the required degrees of freedom, and its coupling to an actuator, currently limit these systems in speed, actuation range, or both.

One approach that allows two degrees of freedom for a single mirror actuation is a gimbal mirror mount. Some such gimbal mounts have inner and outer gimbal frames, each of which can pivot about a respective X or Y axis. The gimbal mirror mount results in a relatively complex mechanical structure that is physically heavy relative to the payload (e.g., a mirror), thus limiting the system speed. While the gimbal mount itself does not limit the actuation range, the challenges of coupling actuators to the gimbal structure make the overall range of actuation for the system less than that of a two-mirror system. Another approach to provide a single mirror system with two degrees of freedom is a flexure. In recent years such flexures were developed to etch silicon wafers for use in micro electro-mechanical systems (MEMS). Flexure systems have a limited actuation angle, and the spring action of the flexure requires the actuation force to vary with the displacement. Additionally, cross-talk between the two actuation axes is a challenge that remains unresolved. Other designs of a single mirror system with two or three degrees of freedom attempt to address the shortcomings of gimbal and flexure approaches. However, the payload-to-actuator interface remains mechanically overconstrained and requires flexures to decouple actuators from the system base. This, in turn, complicates the control logic as the spatial orientation of the actuators depends on the payload orientation. Therefore, a need exists for an improved joint and optical scanning apparatus utilizing a single mirror. The present disclosure addresses this need, among others.

As used herein, the term "point contact" generally refers to the smallest possible contact between two continuous surfaces. For ideal surfaces, point contact can be a single atom; however, due to manufacturing limitations, point contact may be greater than a single point. For example, even finely polished smooth surfaces may exhibit grooves, ridges, and facets when viewed at the microscopic level. As such, point contact between two surfaces may include a one or more of such features on one surface making contact with one or more such features on another surface, for example. Thus, the term "point contact" between two surfaces includes a single point in addition to a small localized area of a surface or a plurality of points within a size of up to 1% of the surface area.

As discussed herein, terms referencing direction, such as upward, downward, vertical, horizontal, left, right, top, bottom, etc., are used for convenience to describe embodiments of a magnetic joint as shown in the drawings. The present disclosure is not limited by these directional references and it is contemplated that a magnetic joint and positioning structures can be used in any orientation.

Example Embodiments

Figure 1A:
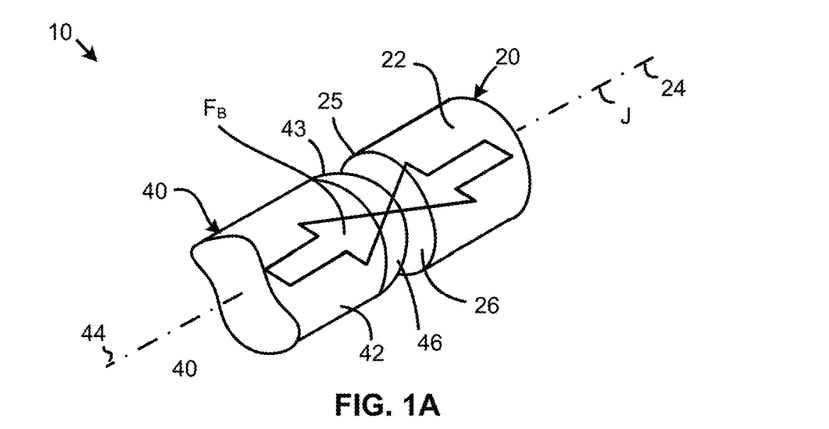
FIG. 1A illustrates a perspective view of a laterally unconstrained magnetic joint that includes a first component and a second component magnetically attracted to each other along a joint axis, in accordance with an embodiment of the present disclosure.
Figure 1B:
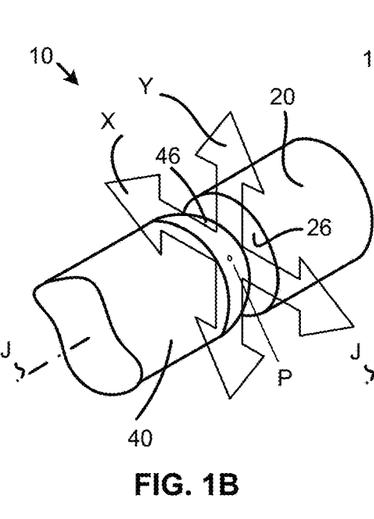
FIG. 1B illustrates a perspective view of the magnetic joint of FIG. 1A showing freedom of movement about X and Y axes, in accordance with an embodiment of the present disclosure.
Figure 1C:
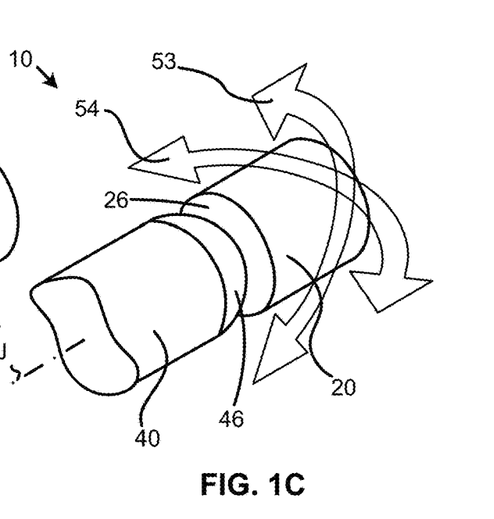
FIG. 1C illustrates the magnetic joint of FIG. 1A with arrows representing possible movement of the first component relative to the second component, in accordance with an embodiment of the present disclosure.

FIGS. 1A-1C depict perspective views of a magnetic joint 10 that includes a first component 20 and a second component 40, in accordance with some embodiments of the present disclosure. The first component 20 has a body 22 that extends along a first axis 24 to a proximal end portion 25 defining a first interface surface 26. In one embodiment, the first interface surface 26 is planar or concave and defines a first radius of curvature R1. Note that a planar surface has a radius of curvature that can be thought of as infinite. The second component 40 has a body 42 that extends along a second axis 44 to a distal end portion 43 defining a second interface surface 46. In one embodiment, the second interface surface 46 is convex or domed with a second radius of curvature R2. The first radius of curvature R1 of the first interface surface 26 is greater than the second radius of curvature R2 of the second interface surface 46. Accordingly, the first interface surface 26 is generally flatter than the second interface surface 46, according to some such embodiments. The first component 20 and the second component 40 have a point contact throughout the range of articulation. At the point of contact P, the normals to the first and second interfacing surfaces 26, 46 are collinear. The nominal, or aligned, joint orientation is when geometrical axes (e.g., first axis 24 and second axis 44) of the rotationally symmetric first and second components 20, 40 are collinear. For any joint articulation geometry, the joint axis J is a line going through the point of contact P perpendicular to both the first interface surface 26 and to the second interface surface 46.

In some specific such embodiments, the first radius of curvature R1 is twice, four times, ten times, or larger value greater than the second radius of curvature R2. In one embodiment, the first radius of curvature R1 is sufficiently large compared to the diameter of the body 22 to render the first interface surface 26 generally planar, such as being planar within manufacturing tolerances.

Figure 1D:
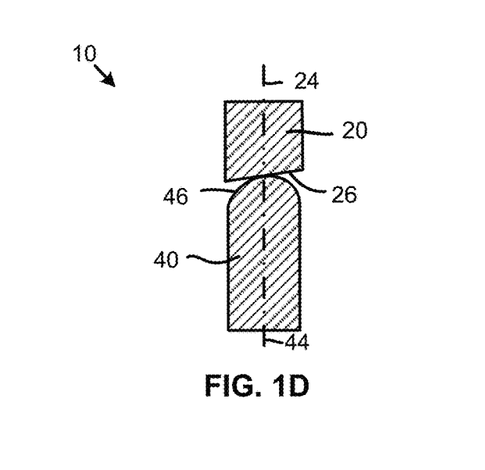
FIG. 1D illustrates a cross-sectional view of a magnetic joint with asymmetrical interface surfaces, in accordance with an embodiment of the present disclosure.

In one embodiment, the first interface surface 26 and/or second interface surface 46 is symmetrical about the respective first axis 24 or second axis 44. For example, the second interface surface 46 is hemispherical or a portion of a spherical surface. The first interface surface 26 can have a flat, concave, or convex shape. In other embodiments, the first interface surface 26 and/or the second interface surface 46 is not symmetrical about its respective axis, but instead is symmetrical about a plane containing the axis or does not have a symmetrical shape. In one example, the second interface surface 46 has an elliptical, parabolic, or other shape. In another example, the second interface surface 46 has a convex, curved surface where the most distal point is offset radially from the second axis 44. Similar concave geometries may apply to the first interface surface 26, as will be appreciated. In another example embodiment, the first interface surface 26 is generally planar along a plane that is inclined to (i.e., not perpendicular to) the first axis 24. For instance, FIG. 1D illustrates a cross-sectional view of a magnetic joint 10 in which the first interface surface 26 of the first component 20 is inclined to the first axis 24 and the second interface surface 46 of the second component 40 is convex and asymmetrical about the second axis 42. Numerous other variations and example embodiments will be apparent in light of the present disclosure.

In some embodiments, the nature of the interface between a planar first interface surface 26 and a convex second interface surface 46 allows the second component 40 to move laterally, or perpendicular, to the joint axis J with respect to the first component 20, as shown by the arrows in FIG. 1B. For example, the second interface surface 46 is unconstrained from moving across and in contact with the first interface surface 26. While in some embodiments the convex second interface surface 46 is spherical and the mating first interface surface 26 is flat, any two continuous surfaces that form and maintain a point contact over the desired range of actuation are acceptable, as will be appreciated in light of this disclosure.

One or both of the first component 20 and the second component 40 is made of or includes a permanent magnet material. The first component 20 and the second component 40 are attracted by magnetic force towards each other. For example, the first component 20 includes a permanent magnet and the second component 40 is made of or includes a ferromagnetic material, or vice versa. In another example embodiment, both the first component 20 and the second component 40 include a permanent magnet material magnetized in the same direction along the joint axis J in the nominal joint orientation. In some such embodiments, the magnetic field B of the permanent magnet material is aligned along the respective axis of the component. For example, the magnetic field is oriented along the first axis 22 and/or the second axis 42. In some such embodiments, a magnetic force $F_B$ attracts the first and second components 20, 40 towards each other along the joint axis J when the magnetic joint 10 is at equilibrium, such as shown in FIG. 1A.

As used herein, the joint axis J can be defined as an imaginary line passing through the point of contact P between the first component 20 and the second component 40, where the joint axis J is perpendicular to the first interface surface 26 and to the second interface surface 46. The magnetic field is often parallel to the joint axis J at the point of contact P, but this may not be the case for all embodiments and all positions of the magnetic joint 10. In some embodiments in which the permanent magnetic material is magnetized along the first axis 24, the joint axis may be coaxial with the first axis 24 when the magnetic joint 10 is at equilibrium. Similarly, the joint axis J may be coaxial with the second axis 44 when the permanent magnetic material is magnetized along the second axis 44 and the magnetic joint 10 is at equilibrium. In some embodiments, the joint axis J is collinear with the first axis 24 of the first component 20 and with the second axis 44 the second component 40 when the magnetic joint 10 is at equilibrium.

The magnetic joint 10 is free to articulate within three rotational degrees of freedom, two of which are around an X axis and a Y axis that are perpendicular to the joint axis J as shown, for example, in FIG. 1B. Articulation of the magnetic joint 10 about the X and Y axes is limited by the extent of contact between the first interface surface 26 and the second interface surface 46. As a result, the first component 20 can tip or tilt with respect to the second component 40 as indicated, for example, by arrows 53, 54 in FIG. 1C. In addition to tip-tilt movement, the point of contact P between the first and second components 20, 40 can move along the first interface surface 26 and/or the second interface surface 46 as the magnetic joint 10 articulates. For example, the point of contact P can move away from the geometric centers of the first interface surface 26 and second interface surface 46 as the first component 20 slides on the convex second interface surface 46.

Referring now to FIGS. 2A-2D, side cross-sectional views illustrate an example of a magnetic joint 10 with the first component 20 made of a neodymium iron boron magnet and the second component 40 made of ferromagnetic steel, in accordance with an embodiment of the present disclosure. Simulated field lines of magnetic field B are shown for the magnetic joint 10 in various positions. The magnetic field B is oriented along the first axis 24. The first component 20 is rotationally symmetrical about the first axis 24 and the second component 40 is rotationally symmetrical about the second axis 44. In each of FIGS. 2A-2D, the joint axis J extends perpendicularly to both of the first interface surface 26 and the second interface surface 46. In each position, the first interface surface 26 is tangent to the convex second interface surface 46.

Figure 2A:
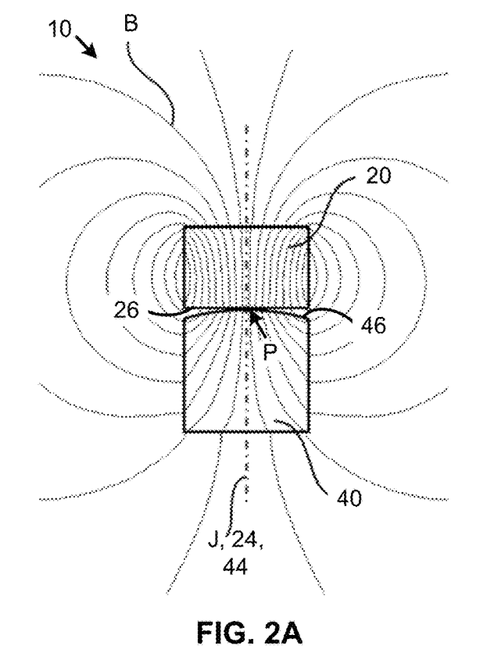
FIGS. 2A-2D illustrate side views of a laterally unconstrained magnetic joint, magnetic field lines, and a joint axis for various positions of the first and second component, in accordance with some embodiments of the present disclosure.

In FIG. 2A the magnetic joint 10 is in a nominal orientation and at equilibrium in which the joint axis J is collinear with the first axis 24 and the second axis 44. The field lines of the magnetic field B are generally symmetrical about the joint axis J. The first interface surface 26 is tangent to the second interface surface 46 at the point of contact P, which is coincident with the joint axis J.

Figure 2B:
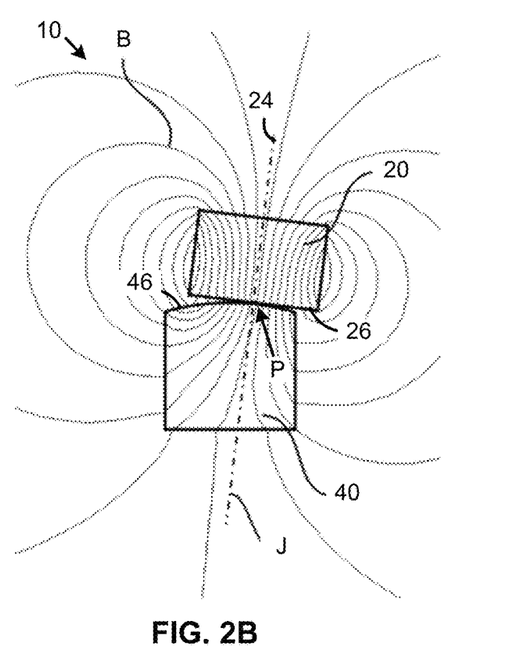

In FIG. 2B, the magnetic joint is articulated with the first component 20 tilted and translated along the second interface surface 46 of the second component 40. Note that the joint axis J extends through the center (i.e., along first axis 24) of the first component 20. The first interface surface 26 is tangent to the second interface surface 46 at the point of contact P.

Figure 2C:
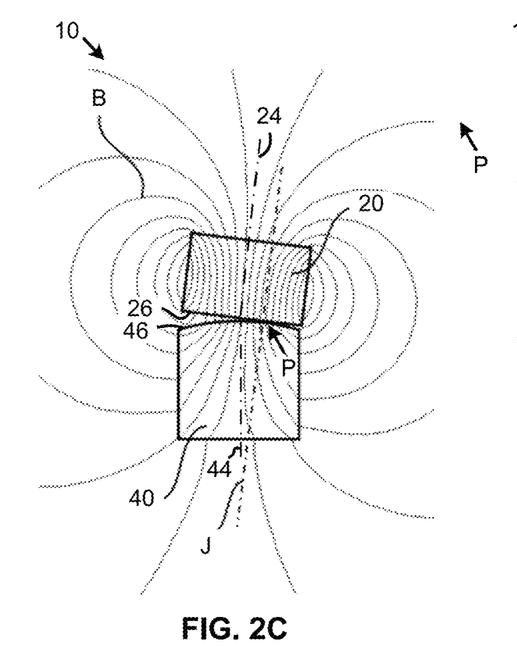

In FIG. 2C, the magnetic joint is articulated with the first component 20 tilted relative to the second interface surface 46 of the second component 40. Note that the joint axis J does not extend through the center (i.e., along first axis 24) of the first component 20, but it is perpendicular to each of the first interface surface 26 and the second interface surface 46. The first interface surface 26 is tangent to the second interface surface 46 at the point of contact P, which is now to the right of the first axis 24 as illustrated.

Figure 2D:
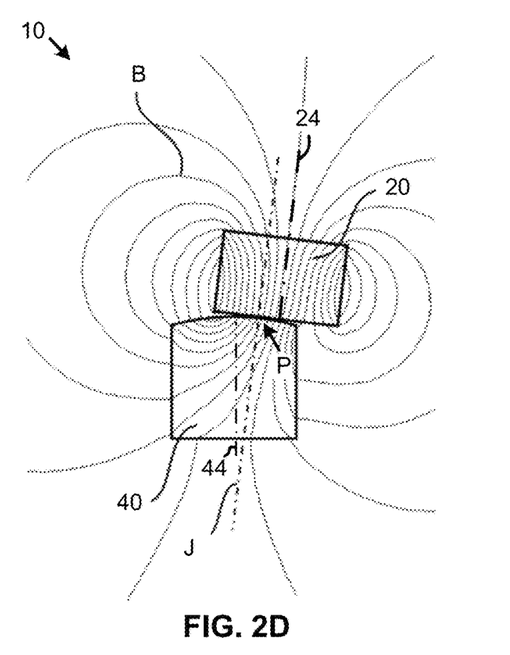

In FIG. 2D, the magnetic joint is articulated with the first component 20 tilted and translated relative to the second component 40. Note that the joint axis J does not extend through the center (i.e., along first axis 24) of the first component 20, but it is perpendicular to each of the first interface surface 26 and the second interface surface 46. The first interface surface 26 is tangent to the second interface surface 46 at the point of contact P, which is now to the left of the first axis 24 as illustrated.

Figure 3A:
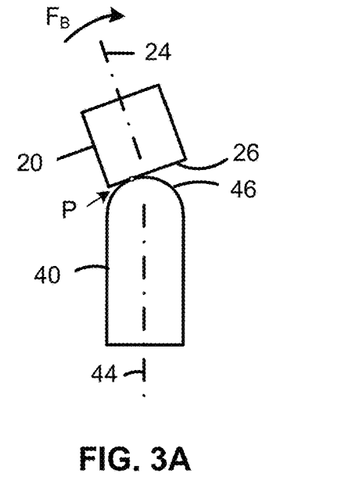
FIGS. 3A and 3B illustrate side views of a laterally unconstrained magnetic joint and in various articulated positions and examples of magnetic field forces acting on one component to return the joint to an equilibrium position, in accordance with an embodiment of the present disclosure.
Figure 3B:
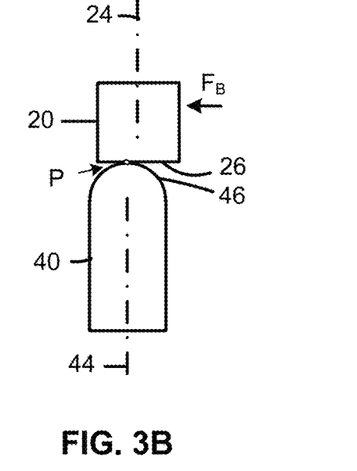

For all possible geometries, the first component 20 and the second component 40 have a position of one component relative to the other when the lateral magnetic forces are at equilibrium. For rotationally symmetric embodiments, this condition is satisfied when the first axis 24 and the second axis 44 are collinear (gravity and other forces not considered). Pivot (e.g., tip-tilt) displacement or lateral displacement (e.g., translation) of the first component 20 relative to the second component 40, such as shown in FIGS. 3A and 3B, respectively, can result in a magnetic force $F_B$ towards the equilibrium condition for some geometries, thus stabilizing the magnetic joint 10 and retaining contact between the components. The direction of the magnetic force $F_B$ in FIGS. 3A and 3B is illustrated as an example for rotationally symmetric components; the magnetic force $F_B$ may act in other directions in some embodiments. For some geometries, the magnetic joint 10 may have a position where the first component 20 and the second component 40 are not nominally aligned, but the magnetic joint 10 is at equilibrium and there is no magnetic force biasing the first and second components 20, 40 towards a position of nominal alignment.

In each of the examples shown in FIGS. 3A and 3B, the point of contact P between the first component 20 and the second component 40 is offset from the first axis 24. Since the magnetic joint 10 is laterally unconstrained, the point of contact P between the components can move away from the center of each interface surface 26, 46 when the magnetic joint 10 articulates. When three magnetic joints 10 are attached to a payload 12 in a triangular arrangement, such as in an optical mount assembly, the distance between any two of the magnetic joints may change as one of the joints is advanced linearly along the Z axis. Unlike ball-socket joints, for example, the ability of the point of contact P to slide or move enables the laterally unconstrained magnetic joint(s) 10 to accommodate this change in distance.

Figure 4A:
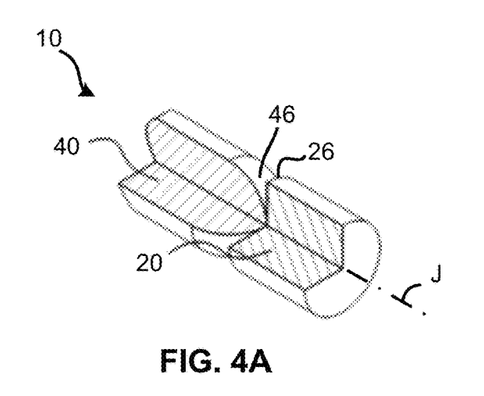
FIGS. 4A-4D illustrate perspective quarter view of various interface surfaces of the first component and the second component, in accordance with some embodiments of the present disclosure.
Figure 4B:
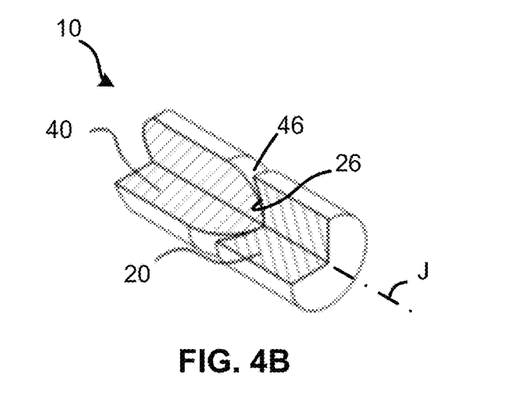

Referring now to FIGS. 4A-4D, perspective quarter-section views show a magnetic joint 10, in accordance with some embodiments of the present disclosure. In each of these embodiments, the magnetic joint 10 is at equilibrium where the first axis 24, second axis 44, and joint axis J are collinear. In the example of FIG. 4A, the first component 20 has a planar first interface surface 26 and the second component 40 has a hemispherical second interface surface 46 that makes a point contact with the first interface surface 26 along the joint axis J. In the example of FIG. 4B, the first component 20 has a concave first interface surface 26 and the second component 40 has a convex second interface surface 46 that makes a point contact with the first interface surface 26 along the joint axis J.

Figure 4C:
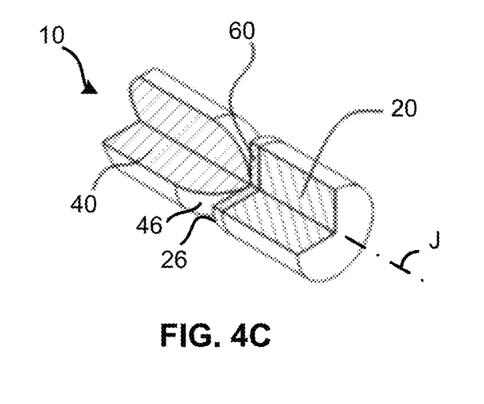

In some embodiments, such as shown in FIG. 4C, the magnetic joint 10 may include an interface material 60 between the first component 20 and the second component 40. The interface material 60 can be selected, for example, to improve bearing properties of the magnetic joint 10. In some such embodiments, the interface material 60 floats between the first component 20 and the second component 40, is attached to one of the joint components 20, 40, or is surface coating on one or both interface surfaces 26, 46. For example, the interface material 60 is chosen to have a low coefficient of friction, a high hardness value, a high resistance to wear, a high compressive strength, a low thermal expansion coefficient, or a combination of these properties. Examples of acceptable interface materials 60 include ferromagnetic and non-magnetic materials, such as a relatively thin sapphire disk bonded to the flat first interface surface 26, and a Titanium Nitride (TiN) thin film coating on one or both of the first and second interfacing surfaces 26, 46. Other interface materials 60 and integration methods can be used to alter secondary joint properties, such as friction, while maintaining magnetic attraction between and allowing lateral motion of the first component 20 relative to the second joint component 40.

Figure 4D:
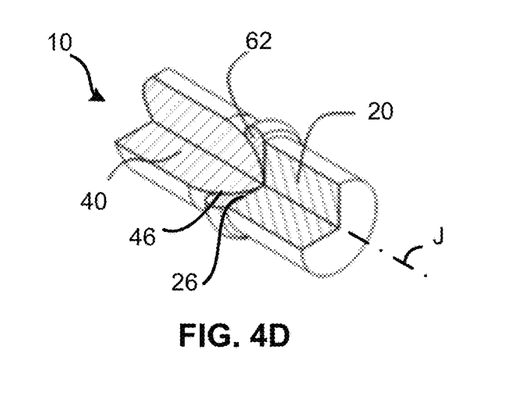

In another embodiment, such as shown in FIG. 4D, for example, the interface material 60 is or includes a ferromagnetic fluid ("ferrofluid") 62. A ferrofluid 62 can be used, for example, to increase the magnetic force $F_B$ attracting the first component 20 to the second component 40, as will be appreciated. The ferrofluid 62 can also be selected to improve the bearing properties by lubricating the interface surfaces 26, 46 of the magnetic joint 10. In some such embodiments, the maximum magnetic force $F_B$ between the first and second interface surfaces 26, 46 can be achieved when the air gap between them is minimized. A ferrofluid 62 can minimize the air gap by occupying void space between the first interface surface 26 and the second interface surface 46 while also permitting the magnetic joint 10 to articulate. The ferrofluid 62 effectively extends the first component and second component 40 beyond their actual physical shapes to simulate the joint having a region of contact between the first interface surface 26 and the second interface surface 46, thereby enhancing the magnetic attraction between the first and second components 20, 40. In some instances, such as when the ferrofluid 62 has sufficient viscosity, a thin layer (e.g., a monolayer) of the ferrofluid 62 may exist between the first interface surface 26 and the second interface surface 46 at the point of contact P. In some such embodiments, the monolayer of ferrofluid 62 behaves as a coating on one or both of the first and second components 20, 40. A typical ferrofluid 62 has ferromagnetic particles that are coated with a surfactant and suspended in a carrier fluid. A ferrofluid 62 composition for a particular magnetic joint 10 can be selected based on the intended application and, in general, is not restricted by the properties of the magnetic joint 10.

Figure 5:
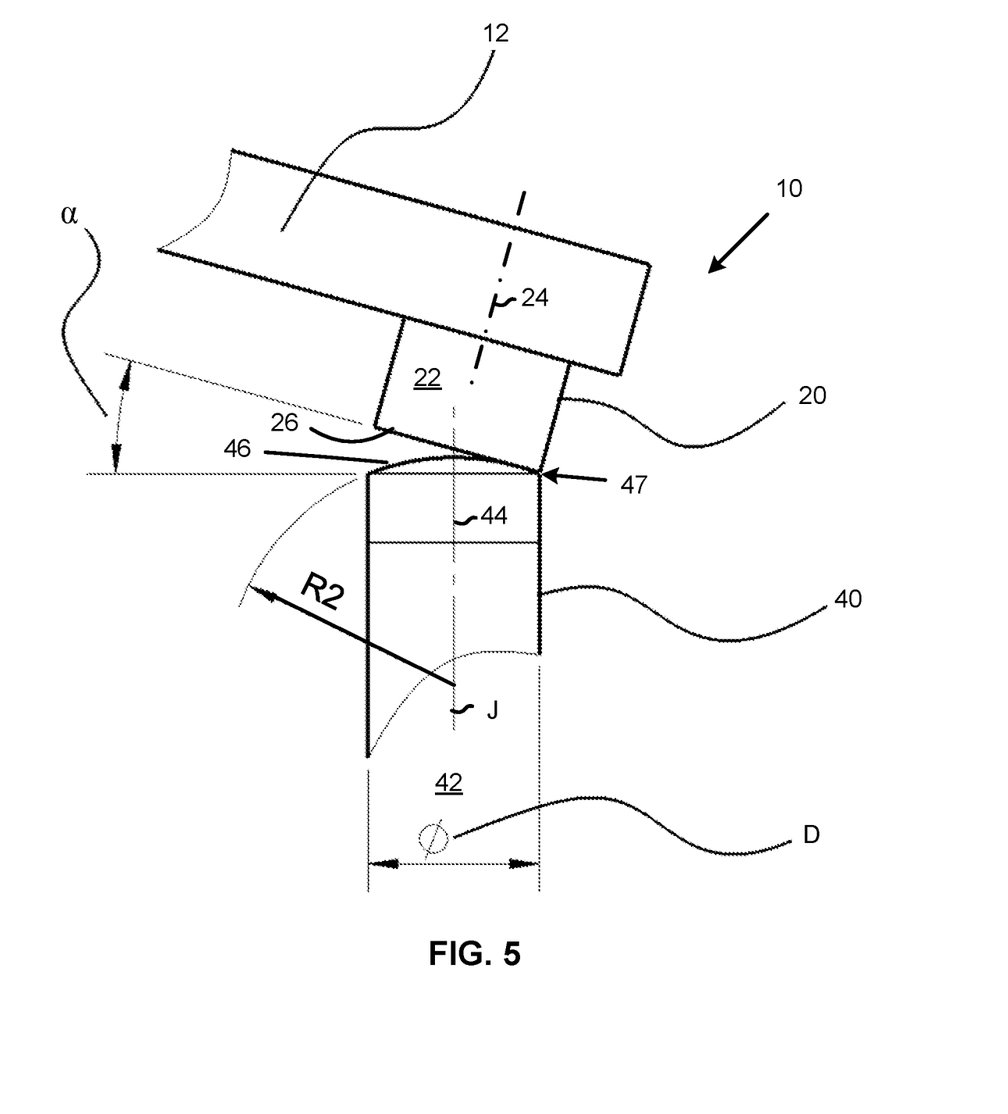
FIG. 5 illustrates a side view of a laterally unconstrained magnetic joint coupled to a payload where the joint is in an articulated position, in accordance with an embodiment of the present disclosure.

Referring now to FIG. 5, a side view illustrates an example of a magnetic joint 10 in use with a payload 12, in accordance with an embodiment of the present disclosure. In one embodiment, the magnetic joint 10 is axially symmetric, where the first component 20 is rotationally symmetrical about the first axis 24 and the second component 40 is rotationally symmetrical about the second axis 44. In other embodiments, only one or neither of the first component 20 and the second component 40 is rotationally symmetrical about is respective axis 24, 44. In this example, the first component 20 has a planar first interface surface 26 and the second component 40 has a convex second interface surface 46. The maximum actuation angle $\alpha$ of the payload 12 is a function of the second radius of curvature R2 of the convex second interface surface 46 and the diameter D of the body 42 of the second component 40 at the margin 47 of the second interface surface 46. For example, the maximum actuation angle $\alpha$ is achieved when the first interface surface 26 and the second interface surface 46 make contact at the margin 47 of the second interface surface 46. Stated another way, the maximum actuation angle $\alpha$ occurs when the first interface surface 26 is tangent to the second interface surface 46 at the margin 47. The margin 47 is located at the intersection between the body 42 and the second interface surface, in accordance with some embodiments. It is contemplated that the body 42 of the first component 40 or the body 22 of the first component 20 may have a diameter that is smaller than or larger than that of the respective interface surface 46, 26. For example, the body may taper to a smaller diameter from its intersection with the interface surface.

In some embodiments, the maximum actuation angle $\alpha$ of the payload 12 is at least ±5°, at least ±7.5°, at least ±10°, at least ±12.5°, or at least ±15° relative to the nominal position shown in FIG. 2A. In one example, the convex second interface surface 46 is part of a sphere and has a radius of curvature R2 that spans 10°, 20°, 30°, 35° or some other portion of the sphere. These values occur when the second axis 44 is vertical and the radius of curvature to the margin 47 has an angle of 85°, 80°, 75°, or 72.5° to the horizontal, respectively. Using a planar first interface surface 26, the corresponding maximum actuation angle $\alpha$ for these values is ±5°, ±10°, ±15°, or ±17.5°, respectively. Numerous variations and embodiments will be apparent in light of the present disclosure.

Figure 6:
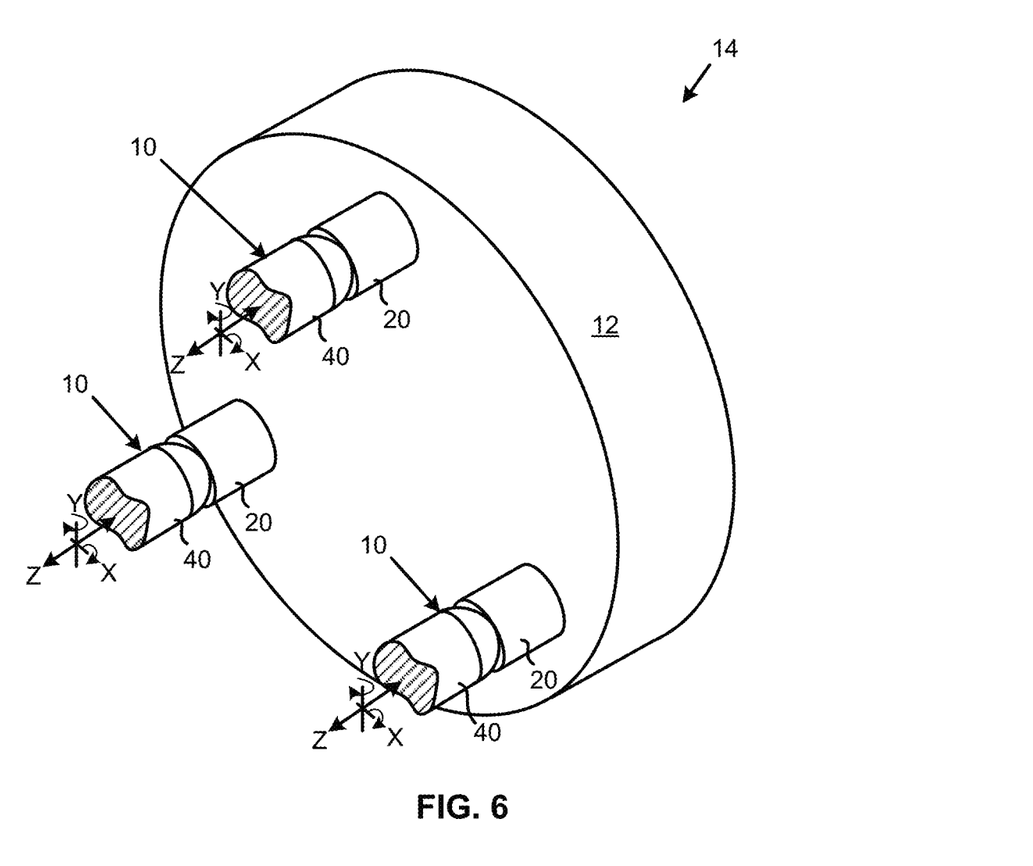
FIG. 6 illustrates a perspective view showing a payload with three laterally unconstrained magnetic joints attached, in accordance with an embodiment of the present disclosure.
Figure 7A:
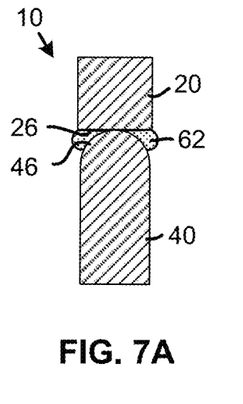
FIGS. 7A-7D illustrate cross-sectional views of some example geometries of the magnetic joints shown in FIG. 6, in accordance with some embodiments of the present disclosure.
Figure 7B:
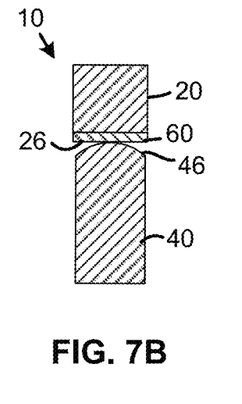
Figure 7C:
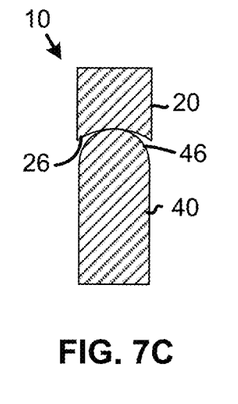
Figure 7D:
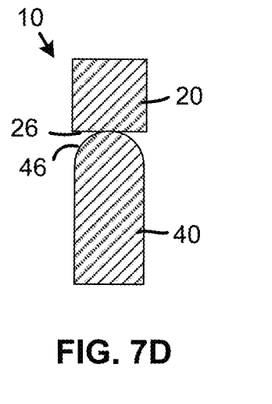

Referring now to FIG. 6, a bottom perspective view illustrates an example of an optical mount 14 that includes three magnetic joints 10 attached to a payload 12, in accordance with an embodiment of the present disclosure. In this example, each of the magnetic joints 10 is configured so that the first component 20 is laterally unconstrained with respect to the second component 40. The optical mount 14 utilizes three magnetic joints 10 arranged in a triangle or any configuration other than arranged along a line, thus defining a plane with three points in space. In one embodiment, each of the magnetic joints 10 provides piston-tip-tilt functionality. For example, the magnetic joint 10 can pivot about X and Y axes and move linearly along a Z axis.

In one example, the first component 20 of each magnetic joint 10 attaches to or otherwise interfaces with a mirror, a mirror mount, or any other type of payload 12. The second component 40 of the magnetic joint 10, is attached to or coupled to a linear actuator or adjustor (not shown). The arrangement of the first component 20 and second component 40 may be reversed in some embodiments, as will be appreciated. In some embodiments, the optical mount 14 has three magnetic joints 10 that interface with a respective linear actuator. In another embodiment capable of tip-tilt functionality for the payload, the optical mount 14 has two magnetic joints 10 that each interface with a linear actuator or adjustor, and a third magnetic joint 10 is statically attached to a reference point on the payload 12. Examples of adjustors and linear actuators include any combination of manual or motorized devices including but not limited to screws, fine-pitch screws, micrometers, differential screws, piezo actuators, leadscrews, ball-screws, roller screws, rack and pinions, chain drives, belt drives, hydraulic actuators, pneumatic actuators, voice-coils, and linear drives.

To position the payload 12 as desired, one or more of the linear actuators or adjustors moves its respective magnetic joint 10 linearly along a Z axis. As one or more of the linear actuators moves the magnetic joint 10, each of the magnetic joints 10 may tip-tilt as needed to accommodate the position of the payload 12. If the distance between any two of the magnetic joints 10 changes, the magnetic joint(s) 10 may accommodate this change due to being laterally unconstrained. As such, the first component 20 may translate and/or tilt relative to the second component, such as discussed above with reference to FIGS. 2A-2D. While most embodiments of an optical mount 14 are expected to have the adjustors or linear actuators act along parallel Z axes, other embodiments may have different configurations. Regardless of the actuation direction or type, some such optical mounts 14 can utilize one or more laterally unconstrained magnetic joint 10 as variously described herein to decouple the adjustment and/or actuation mechanism from the payload 12.

Each of the magnetic joints 10 of FIG. 6 can have one of the example configurations shown in the cross-sectional views of FIGS. 7A-7D. The magnetic joint 10 of FIG. 7A has a first component with a planar first interface surface 26 and a second component 40 with a convex (e.g., hemispherical) second interface surface 46. A ferrofluid 62 is disposed between the first interface surface 26 and the second interface surface 46. The magnetic joint 10 of FIG. 7B has a first component with an interface material 60 defining the first interface surface 26. The second component 40 has a convex second interface surface in contact with the interface material 60, which is generally planar. The magnetic joint of FIG. 7C has a first component with a concave first interface surface 26 and a second component 40 with a convex second interface surface 46. The radius of curvature of the concave first interface surface 26 is greater than the radius of curvature of the convex second interface surface 46. The magnetic joint of FIG. 7D has a first component 20 with a planar first interface surface 26 and a second component 40 with a convex second interface surface 46. In each of these examples, one or both of the first component 20 and the second component 40 may be made of or contain a permanent magnet material. In some embodiments, the first component 20 is or contains a permanent magnet and the second component is made of ferromagnetic steel or other ferromagnetic material. In general, convex or concave surfaces are spherical, but this is not required. In some embodiments, a convex or concave surface has a circular, parabolic, hyperbolic, elliptical, sine, or other rounded cross-sectional profile.

Figure 8A:
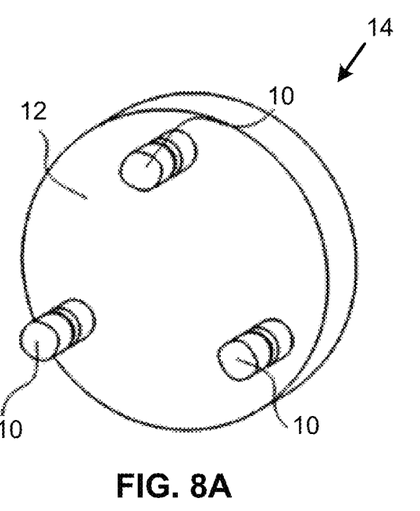
FIGS. 8A-8C illustrate perspective views of an optical mount showing various arrangements of three magnetic joints, in accordance with some embodiments of the present disclosure.
Figure 8B:
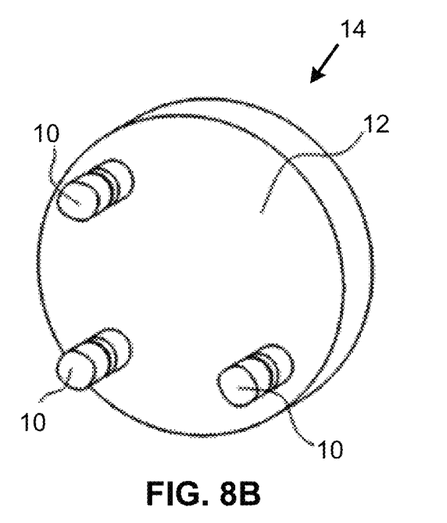
Figure 8C:
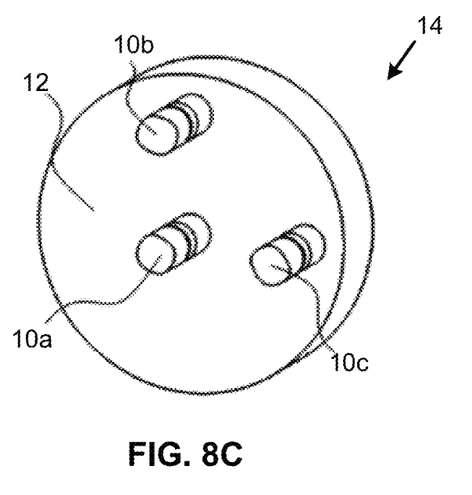

Example arrangements of magnetic joints 10 on an optical mount 14 are shown in FIGS. 8A-8C. FIG. 8A illustrates an example of magnetic joints 10 arranged in an equilateral triangle that provides symmetrical mounting of the payload 12. In such an arrangement, forces acting on the magnetic joints 10 may be equalized under uniform operating conditions. FIG. 8B illustrates an arrangement of magnetic joints with an orthogonal arrangement or L-shape that can provide orthogonal actuation during adjustment. Such an arrangement can provide tip-tilt actuation, as will be appreciated. FIG. 8C illustrates an arrangement of magnetic joints 10 that provides a functional equivalent of a gimbal mount, which minimizes path length variation during adjustment. Note that in this arrangement the magnetic joints have an orthogonal arrangement or L-shape with magnetic joint 10a located at the center of the payload 12. A line through magnetic joints 10a and 10b is perpendicular or orthogonal to a line through magnetic joints 10a and 10c.

Figure 9:
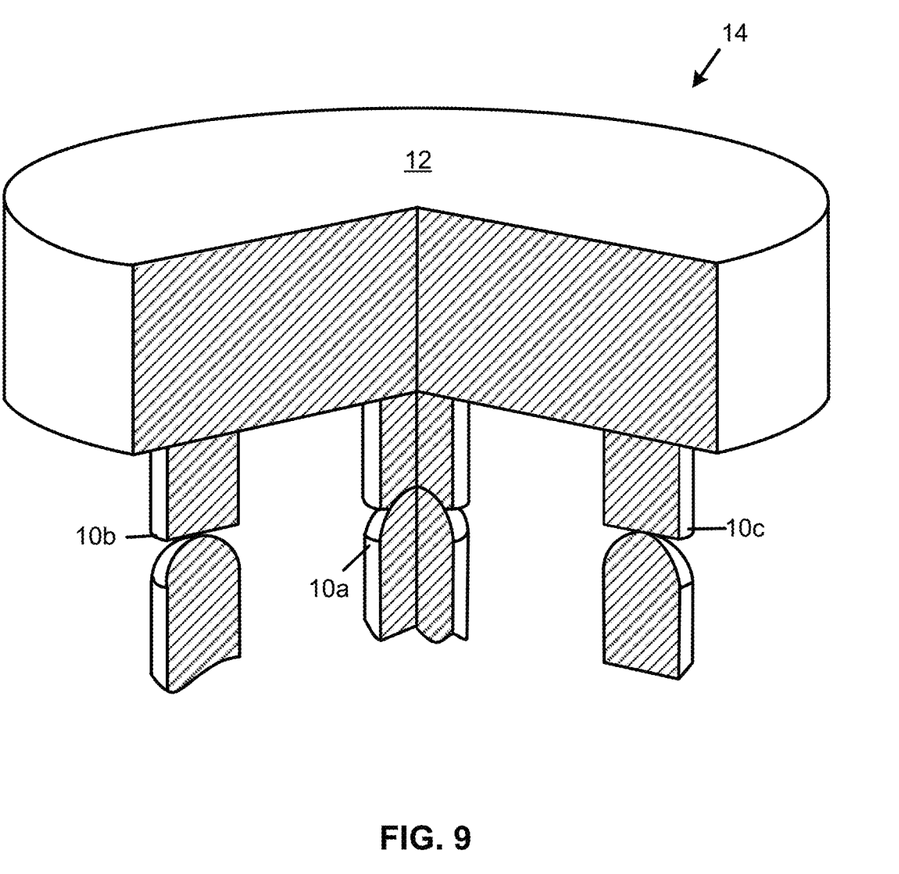
FIG. 9 illustrates a perspective one-third section of an optical mount with two laterally unconstrained magnetic joints and one ball joint, in accordance with an embodiment of the present disclosure.

Laterally unconstrained magnetic joints 10 can be used in an optical mount 14 in combination with other joints to achieve the desired degrees of freedom. For example, two laterally unconstrained magnetic joints 10 are sufficient to laterally decouple tip-tilt and piston-tip-tilt adjustment and/or actuation mechanism from the mirror, mirror mount, or any other type of payload 12. FIG. 9 illustrates a perspective quarter section view of an optical mount 14 with ball joint 10a (magnetic or non-magnetic) and magnetic joints 10b, 10c. In this example, the ball joint 10a and magnetic joints 10b, 10c are arranged orthogonally as shown in FIG. 8C. The ball joint 10a has mating spherical interface surfaces and is located at the center of the payload 12. As a result, the payload 12 is laterally constrained by the ball joint 10a at the center of the payload 12, while the two laterally unconstrained magnetic joints 10b, 10c decouple tip-tilt actuation of the payload 12.

Other combinations of constrained joints and laterally unconstrained magnetic joints 10 are possible. The function of the laterally unconstrained magnetic joints 10 is to laterally decouple the adjustment and/or actuation mechanism from the mirror, mirror mount, or any other type of payload, in accordance with some embodiments.

Figure 10:
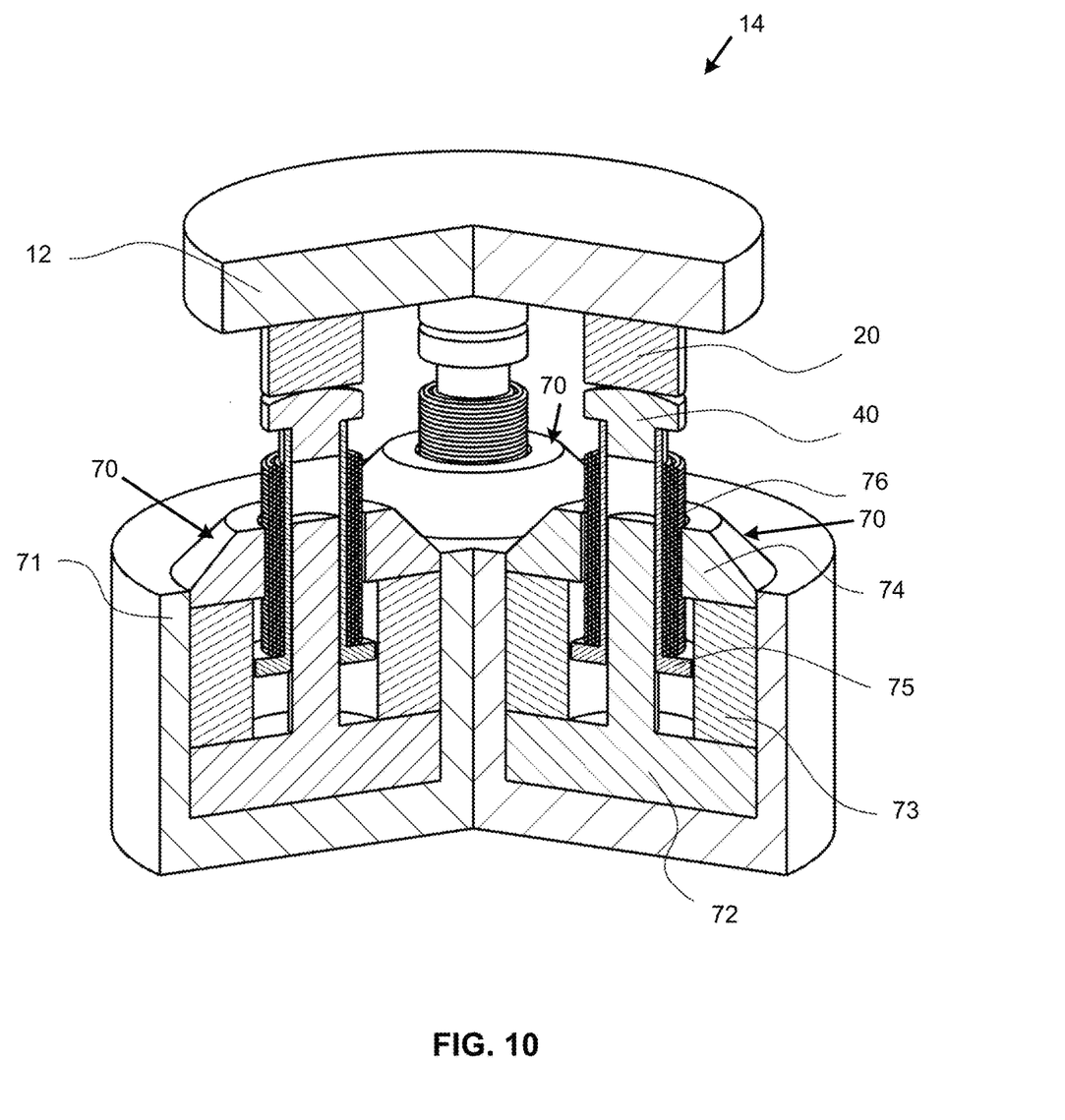
FIG. 10 illustrates an optical mount with laterally unconstrained magnetic joints with voice coil actuators coupled to each joint, in accordance with an embodiment of the present disclosure.

FIG. 10 illustrates a perspective quarter sectional view of an optical mount 14 configured as a wide angle, three degrees of freedom scanning mirror (sometimes referred to as a "3D Scanner"), in accordance with an embodiment of the present disclosure. The optical mount 14 has three linear actuators 70 located symmetrically in a housing 71, which typically is made of a non-magnetic material. In this example, each actuator 70 is a linear voice-coil having stationary parts that include a center pole piece 72, permanent magnet 73, and top pole piece 74. Moving parts of the voice coil actuator 70 include a coil frame 75 and a wire coil

76. The second component 40 of the laterally unconstrained magnetic joint 10 is placed at the end of the coil frame 75. The first component 20 of the magnetic joint 10 is attached to the payload 12 (e.g., a mirror).

In some embodiments, the 3D scanner utilizes linear voice-coil actuators 70 having a configuration of the north-south pole orientations between the magnets of the laterally unconstrained magnetic joint 10 and the permanent magnet(s) 73 of the voice-coil such that the magnetic attractive force increases between the first component 20 and the second component 40 of the magnetic joint 10 when actuator 70 is driven away from the payload 12 and decreases when the actuator 70 is driven towards the payload 12. In the embodiment depicted in FIG. 10 this condition can be achieved when the direction from south to north pole of the voice-coil magnet 73 is opposite to that of the magnetic joint 10 (e.g., magnetic first component 20). Such behavior increases the usable acceleration range and therefore the bandwidth of the 3D scanner.

Other embodiments of the 3D scanner may have different actuation methods and geometries including but not limited to piezo actuators, linear electric motors, etc., provided that such embodiments utilize one or more laterally unconstrained magnetic joint 10 for payload 12 mounting, in accordance with some embodiments of the present disclosure. Numerous variations and embodiments will be apparent in light of the present disclosure.

Further Example Embodiments:

The following examples pertain to further embodiments, from which numerous permutations and configurations will be apparent.

Example 1 is a magnetic joint comprising: a first component having a first body extending along a first axis to a first interface surface, the first interface surface defining a first curvature; and a second component having a body extending along a second axis to a convex second interface surface in contact with the first interface surface, the second interface surface defining a second curvature that is different from the first curvature; wherein at least one of the first component and the second component comprises a permanent magnet and wherein the first component and the second component are magnetically attracted to each other. In some examples, the magnetic joint is provided in a disassembled form where the convex second interface surface is configured to be positioned in contact with the first interface surface.

Example 2 includes the subject matter of Example 1, wherein the first component comprises the permanent magnet and the second component comprises a ferromagnetic material, the first permanent magnet is magnetized along the first axis.

Example 3 includes the subject matter of Example 1, wherein the first component comprises a first permanent magnet magnetized along the first axis and the second component comprises a second permanent magnet magnetized along the second axis.

Example 4 includes the subject matter of Example 1, wherein the second component comprises the permanent magnet and the first component comprises a ferromagnetic material, wherein the permanent magnet is magnetized along the second axis.

Example 5 includes the subject matter of any of Examples 1-4, wherein movement of the first component is laterally unconstrained with respect to the second component.

Example 6 includes the subject matter of any of Examples 1-5, wherein the first interface surface makes a point contact with the second interface surface.

Example 7 includes the subject matter of any of Examples 1-6, wherein the first axis and the second axis are collinear when magnetic forces between the first component and the second component are at equilibrium.

Example 8 includes the subject matter of any of Examples 1-7, wherein the first interface surface is planar.

Example 9 includes the subject matter of Example 8, wherein the first interface surface comprises sapphire.

Example 10 includes the subject matter of any of Examples 1-9 further comprising a ferrofluid between the first interface surface and the second interface surface.

Example 11 includes the subject matter of any of Example 1-10 further comprising titanium nitride on at least one of the first interface surface and the second interface surface.

Example 12 includes the subject matter of any of Examples 1-11, wherein the first interface surface defines a radius of curvature and the second interface defines a second radius of curvature, the first curvature at least twice the second radius of curvature.

Example 13 includes the subject matter of Example 12, wherein the first radius of curvature is at least four times the second radius of curvature.

Example 14 includes the subject matter of any Example 12, wherein the first radius of curvature is at least ten times the second radius of curvature.

Example 15 includes the subject matter of any of Examples 1-14, wherein the second interface surface has a profile that is part of a (i) circle, (ii) parabola, (iii) a hyperbola, (iv) an ellipse, or (v) a sine wave.

Example 16 includes the subject matter of any of Examples 1-14, wherein the second interface surface spans at least 10° of a sphere.

Example 17 includes the subject matter of any of Examples 1-14, wherein the second interface surface spans at least 15° of a sphere.

Example 18 includes the subject matter of any of Examples 1-14, wherein the second interface surface spans at least 20° of a sphere.

Example 19 includes the subject matter of any of Examples 1-14, wherein the second interface surface spans at least 30° of a sphere.

Example 20 includes the subject matter of any of Examples 1-19, wherein the magnetic joint has a range of articulation of at least ±5°.

Example 21 includes the subject matter of any of Examples 1-19, wherein the magnetic joint has a range of articulation of at least ±10°.

Example 22 includes the subject matter of any of Examples 1-19, wherein the magnetic joint has a range of articulation of at least ±12.5°.

Example 23 includes the subject matter of any of Examples 1-19, wherein the magnetic joint has a range of articulation of at least ±15°.

Example 24 includes the subject matter of any of Examples 1-23, wherein at least one of the first component and the second component is rotationally symmetrical about the respective first axis or second axis.

Example 25 includes the subject matter of any of Examples 1-24 further comprising a linear actuator coupled to one of the first component and the second component.

Example 26 includes the subject matter of Example 25, wherein the magnetic joint can articulate with three degrees of freedom.

Example 27 is a magnetic joint comprising: a first component having a first body extending along a first axis to a first distal end, the first distal end defining a first interface surface; and a second component having a second body extending along a second axis to a second distal end, the second distal end defining a convex second interface surface configured to contact the first interface surface at a point; wherein when the first interface surface is disposed in proximity to the second interface surface the first component and the second component are magnetically attracted to each other along a joint axis that is perpendicular to the first interface surface and to the second interface surface.

Example 28 includes the subject matter of Example 27, wherein movement of the first component is laterally unconstrained with respect to the second component.

Example 29 includes the subject matter of Example 28, wherein movement of the first component is in a direction perpendicular to the joint axis Example 30 includes the subject matter of any of Examples 27-29, wherein the first interface surface is planar.

Example 31 includes the subject matter of Example 30, wherein the first interface surface is perpendicular to the first axis.

Example 32 includes the subject matter of any of Examples 27-31, wherein when the first interface surface is tangent to the second interface surface at a margin of the second interface surface, the first interface surface defines an angle with the second axis of less than 85 degrees.

Example 33 includes the subject matter of any of Examples 27-32, wherein the magnetic joint has a range of articulation of at least ±5°.

Example 34 includes the subject matter of any of Examples 27-32, wherein the magnetic joint has a range of articulation of at least ±7.5°.

Example 35 includes the subject matter of any of Examples 27-32, wherein the magnetic joint has a range of articulation of at least ±10°.

Example 36 includes the subject matter of any of Examples 27-32, wherein the magnetic joint has a range of articulation of at least ±12.5°.

Example 37 includes the subject matter of any of Examples 27-32, wherein the magnetic joint has a range of articulation of at least ±15°.

Example 38 includes the subject matter of any of Examples 27-32, wherein the magnetic joint has a range of articulation of at least at least ±25°.

Example 39 includes the subject matter of any of Examples 27-32, wherein the magnetic joint has a range of articulation of at least ±35°.

Example 40 includes the subject matter of any of Examples 27-32, wherein the magnetic joint has a range of articulation of at least ±40°.

Example 41 includes the subject matter of any of Examples 27-40, wherein the first component comprises a permanent magnet magnetized along the first axis and the second component comprises a ferromagnetic material.

Example 42 includes the subject matter of any of Examples 27-40, wherein the second component comprises a permanent magnet magnetized along the second axis and the first component comprises a ferromagnetic material.

Example 43 includes the subject matter of any of Examples 27-40, wherein the first component comprises a first permanent magnet magnetized along the first axis and the second component comprises a second permanent magnet magnetized along the second axis.

Example 44 includes the subject matter of any of Examples 27-43, wherein the first component is rotationally symmetrical about the first axis and the second component is rotationally symmetrical about the second axis.

Example 45 includes the subject matter of any of Examples 27-44 further comprising a linear actuator coupled to the first component or to the second component.

Example 46 includes the subject matter of any of Examples 27-44 further comprising: a payload secured to one of the first component and the second component; and a linear actuator coupled to the other of the first component and the second component, the linear actuator configured to move the magnetic joint along the first axis or the second axis.

Example 47 includes the subject matter of Example 46, wherein the magnetic joint can articulate with three degrees of freedom.

Example 48 includes the subject matter of any of Examples 46 or 47, wherein the payload comprises a mirror.

Example 49 is a laterally unconstrained magnetic joint comprising: a first component comprising a permanent magnet material; and a second component comprising a permanent magnet or ferromagnetic material, wherein the first component and the second component are magnetically attracted to each other and wherein the first component and the second component interface via continuous interface surfaces of different curvature that form and maintain point contact throughout a range of angular and lateral actuation.

Example 50 includes the subject matter of Example 49, wherein the first component is free to articulate relative to the second component within the constraints of the continuous interface surfaces.

Example 51 includes the subject matter of Example 49, wherein the first interface surface is planar.

Example 52 includes the subject matter of Example 51, wherein the first interface surface includes a non-magnetic interface material. For example, the non-magnetic interface material is sapphire.

Example 53 includes the subject matter of any of Examples 49-52 further comprising a ferrofluid between the first interface surface and the second interface surface.

Example 54 includes the subject matter of any of Examples 49-53, wherein the first component is rotationally symmetrical about a first axis and the second component is rotationally symmetrical about a second axis.

Example 55 includes the subject matter of any of Examples 49-54 further comprising: a payload coupled to the first component; and a linear actuator coupled to the second component; wherein the laterally unconstrained magnetic joint laterally decouples the linear actuator from the payload.

Example 56 is a system comprising: a payload having a first surface and an opposite second surface; at least one linear actuator; and a magnetic joint between the payload and the at least one linear actuator, the magnetic joint including a first component with a first body extending along a first axis to a first distal end defining a first interface surface having a first radius of curvature, and a second component with a second body extending along a second axis to a second distal end defining a convex second interface surface in contact with the first interface surface, the second interface surface defining a second radius of curvature that is different from the first radius of curvature, wherein at least one of the first component and the second component comprises a permanent magnet; wherein the first component is laterally unconstrained with respect to the second component.

Example 57 includes the subject matter of Example 56, wherein the first component and the second component are magnetically attracted to each other along a joint axis extending perpendicularly to the first interface surface and to the second interface surface.

Example 58 includes the subject matter of Example 56 or 57, wherein the first interface surface is planar.

Example 59 includes the subject matter of any of Examples 56-58, wherein the second interface surface has a profile that is one of circular, parabolic, hyperbolic, and elliptical.

Example 60 includes the subject matter of any of Examples 56-59, wherein the first interface surface makes point contact with the second interface surface.

Example 61 includes the subject matter of any of Examples 56-60, wherein the at least one actuator includes a first linear actuator coupled to a first laterally unconstrained magnetic joint and a second linear actuator coupled to a second laterally unconstrained magnetic joint.

Example 62 includes the subject matter of any of Examples 56-61 wherein the at least one actuator comprises a voice coil.

Example 63 includes the subject matter of Example 61 or 62 wherein a magnetic field of the linear actuator is configured so that magnetic attraction increases between the first component and the second component when the actuator moves the payload towards the linear actuator.

Example 64 includes the subject matter of any of Examples 61-63 further comprising an additional joint coupled to the payload, wherein the additional joint, the first laterally unconstrained magnetic joint and the second laterally unconstrained magnetic joint are coupled to the first surface of the payload in a triangular arrangement.

Example 65 includes the subject matter of Example 64, wherein the triangular arrangement defines an equilateral triangle.

Example 66 includes the subject matter of Example 64, wherein the triangular arrangement defines a right triangle.

Example 67 includes the subject matter of Example 66, wherein the additional joint is coupled to a center of the first surface.

Example 68 includes the subject matter of any of Examples 64-67, wherein the additional joint is a ball joint.

Example 69 includes the subject matter of any of Examples 64-67, wherein the additional joint is a third laterally unconstrained magnetic joint.

Example 70 includes the subject matter of any of Examples 64-69 further comprising a third linear actuator coupled to the additional joint.

Example 71 includes the subject matter of any of Examples 56-70, wherein the payload comprises a mirror.

Example 72 includes the subject matter of any of Examples 56-71, wherein the payload has a tilt actuation range of at least 5 degrees.

Example 73 includes the subject matter of any of Examples 56-71, wherein the payload has a tilt actuation range of at least 7.5 degrees.

Example 74 includes the subject matter of any of Examples 56-71, wherein the payload has a tilt actuation range of at least 10 degrees.

Example 75 includes the subject matter of any of Examples 56-71, wherein the payload has a tilt actuation range of at least 12.5 degrees.

Example 76 includes the subject matter of any of Examples 56-71, wherein the payload has a tilt actuation range of at least 15 degrees.

Example 77 includes the subject matter of any of Examples 56-71, wherein the payload has a tilt actuation range of at least 17.5 degrees.

Example 78 includes the subject matter of any of Examples 56-71, wherein the payload has a tilt actuation range of at least 20 degrees.

Example 79 includes the subject matter of any of Examples 56-78 further comprising a ferrofluid between the first interface surface and the second interface surface.

Example 80 includes the subject matter of any of Examples 56-79 at least one of the first interface surface and the second interface surface includes a layer of titanium nitride.

Example 81 is a scanning mirror comprising: a mirror; three joints coupled to the mirror, at least one of the joints comprising a laterally unconstrained magnetic joint including a first component and a second component, wherein the first component is magnetically attracted to the second component; and a linear adjustment means coupled to each laterally unconstrained magnetic joint, the linear adjustment means having a magnetic field configured to increase magnetic attraction between the first component and the second component when the linear adjustment means moves the mirror towards the linear adjustment means.

Example 82 includes the subject matter of Example 81, wherein each of the laterally unconstrained magnetic joints functions to laterally decouple the linear adjustment means from the mirror.

Example 83 includes the subject matter of Example 81 or 82, wherein the first component extends along a first axis to a first interface surface and the second component extends along a second axis to a convex second interface surface in point contact with the first interface surface.

Example 84 includes the subject matter of any of Examples 81-83, wherein at least one of the first component and the second component comprises a permanent magnet.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:
1. A system comprising:
a payload having a first surface and an opposite second surface;
at least one linear actuator; and
a magnetic joint between the payload and the at least one linear actuator, the magnetic joint including
a first component comprising a permanent magnet and defining a first interface surface, wherein a first axis passes through a geometric center of the first interface surface and is perpendicular to the first interface surface, and
a second component defining a convex second interface surface in contact with the first interface surface, wherein a second axis passes through a geometric center of the second interface surface and is perpendicular to the second interface surface,
wherein a magnetic field produced by interaction of the first component with the second component biases the magnetic joint towards an equilibrium position in which the second axis is collinear with the first axis, wherein a joint axis of the magnetic joint is perpendicular to each of the first interface surface and the second interface surface when the magnetic joint is in any position, and the joint axis also passes through the geometric center of each of the first interface surface and the second interface surface when the magnetic joint is in the equilibrium position, and wherein when the magnetic joint is in the equilibrium position, the first axis and the second axis are further collinear with the joint axis.

2. The system of claim 1, wherein the first component is magnetically attracted to the second component along the joint axis.

3. The system of claim 2, wherein the second interface surface is part of a paraboloid, hyperboloid, or ellipsoid.

4. The system of claim 3, wherein the first interface surface makes point contact with the second interface surface.

5. The system of claim 1, wherein the magnetic joint is a first magnetic joint, the system further includes a second magnetic joint, and wherein the at least one actuator includes a first linear actuator coupled to the first magnetic joint and a second linear actuator coupled to the second magnetic joint.

6. The system of claim 5 further comprising an additional joint coupled to the payload, wherein the additional joint, the first magnetic joint and the second magnetic joint are coupled to the first surface of the payload in a triangular arrangement.

7. The system of claim 6, wherein the payload has a tilt actuation range of at least 10 degrees.

8. The system of claim 1, wherein the second component comprises a second permanent magnet magnetized along the second axis.

9. The system of claim 1, wherein the first component includes a non-magnetic bearing material, the first interface surface being a planar surface of the non-magnetic bearing material.

10. The system of claim 9, wherein the non-magnetic bearing material comprises sapphire and wherein the second interface surface includes a layer of titanium nitride.

11. The system of claim 1 further comprising a ferrofluid between the first interface surface and the second interface surface, the ferrofluid comprising ferromagnetic particles suspended in a carrier fluid.

12. The system of claim 1, wherein the first component has a first cross-sectional area perpendicular to the first axis and the second component has a second cross-sectional area perpendicular to the second axis, the second cross-sectional area being substantially the same as the first cross-sectional area.

13. The system of claim 1 wherein the first surface of the payload is parallel to the first interface surface.

14. The system of claim 13, wherein the first surface of the payload includes a mirror.

15. A magnetic joint assembly, the assembly comprising:
a first component comprising a permanent magnet magnetized along a first axis, the first component having a planar first interface surface intersecting the first axis; and a second component comprising a ferromagnetic material and having a convex second interface surface in point contact with the first interface surface, wherein a second axis intersects the second interface surface, wherein the first component and the second component are magnetically attracted to each other along a joint axis that is perpendicular to at least one of the first interface surface and the second interface surface, wherein the first component and the second component maintain point contact throughout a range of angular and lateral actuation, and wherein a magnetic field produced by interaction between the permanent magnet and the ferromagnetic material biases the magnetic joint assembly towards an equilibrium position in which the joint axis is collinear with the first axis and with the second axis.

16. The assembly of claim 15, further comprising a non-magnetic interface material on the first component, the non-magnetic interface material including the first interface surface, and wherein the second component comprises a second permanent magnet magnetized along the second axis and in the same direction as the permanent magnet of the first component.

17. The assembly of claim 15 further comprising a ferrofluid between the first interface surface and the second interface surface, the ferrofluid comprising ferromagnetic particles suspended in a carrier fluid.

18. The assembly of claim 17, wherein the first component has a first cross-sectional size and the second component has a second cross-sectional size that is substantially the same as the first cross-sectional size.

19. A magnetic joint assembly, the assembly comprising:
a first component extending along a first axis and comprising a first permanent magnet magnetized along the first axis, the first component having a planar interface surface intersecting the first axis; and a second component extending along a second axis and comprising a second permanent magnet magnetized along the second axis, the second component having a convex second interface surface in point contact with the planar interface surface, the second axis intersecting the convex second interface surface;

wherein the first component and the second component are magnetically attracted to each other along a joint axis that is perpendicular to the convex second interface surface, wherein the first component and the second component maintain point contact throughout a range of angular and lateral actuation, and wherein a magnetic field produced by interaction of the first component and the second component biases the assembly towards an equilibrium position in which the joint axis is collinear with the first axis and with the second axis.

20. The assembly of claim 19, wherein the first component has a first cross-sectional area perpendicular to the first axis and the second component has a second cross-sectional area perpendicular to the second axis, the second cross-sectional area being substantially the same as the first cross-sectional area.

* * * * *